US008635638B2

(12) United States Patent
Phielipp

(10) Patent No.: US 8,635,638 B2
(45) Date of Patent: Jan. 21, 2014

(54) METHOD OF DETERMINING PROFILES FOR WIDGET CHANNEL VIEWERS

(75) Inventor: Mariano J. Phielipp, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 726 days.

(21) Appl. No.: 12/889,723

(22) Filed: Sep. 24, 2010

(65) Prior Publication Data

US 2012/0079516 A1   Mar. 29, 2012

(51) Int. Cl.
    *H04H 60/32* (2008.01)
(52) U.S. Cl.
    USPC .......................................................... 725/14
(58) Field of Classification Search
    USPC ............ 725/14, 110, 40, 51, 87, 112; 705/10, 705/14; 702/141; 707/627; 715/730
    See application file for complete search history.

(56) References Cited

U.S. PATENT DOCUMENTS

| 2008/0228429 | A1* | 9/2008 | Huang et al. ................. 702/141 |
| 2009/0006206 | A1* | 1/2009 | Groe et al. ...................... 705/14 |
| 2009/0171754 | A1* | 7/2009 | Kane et al. ..................... 705/10 |
| 2009/0171760 | A1* | 7/2009 | Aarnio et al. .................. 705/10 |
| 2010/0131981 | A1 | 5/2010 | Choi |
| 2010/0180314 | A1* | 7/2010 | Kim et al. ...................... 725/110 |
| 2010/0274760 | A1* | 10/2010 | Diot et al. ...................... 707/627 |
| 2011/0060994 | A1* | 3/2011 | Maxwell et al. .............. 715/730 |

FOREIGN PATENT DOCUMENTS

| EP | 2200198 A2 | 6/2010 |
| WO | 2009/074558 A2 | 6/2009 |

OTHER PUBLICATIONS

International Search Report and Written Opinion received for PCT Patent Application No. PCT/US2011/053119, mailed on Apr. 12, 2012, 10 pages.
Luxburg, "A Tutorial on Spectral Clustering", Statistics and Computing, vol. 17, No. 4, 2007, pp. 1-32.

* cited by examiner

*Primary Examiner* — Nasser Goodarzi
*Assistant Examiner* — An Nguyen
(74) *Attorney, Agent, or Firm* — Steven Skabrat

(57) ABSTRACT

In a digital content entertainment system, attributes vectors storing values for attributes of each of a plurality of widgets installed in the digital content entertainment system are obtained. A profiler component automatically creates at least one profile of a viewer of the digital content entertainment system by performing a spectral clustering process on the attributes vectors. The digital content entertainment system proactively obtains and presents digital content of interest to the viewer on a display of the digital content entertainment system based on the automatically generated viewer profile.

23 Claims, 7 Drawing Sheets

Input Data from Widgets

| Widgets | Age | Income | Genre | ZIP |
|---|---|---|---|---|
| A | 10 | 10000 | FICTION | 85000 |
| B | 11 | 10000 | FICTION | 85001 |
| C | 12 | 5000 | FICTION | 85003 |
| D | 11 | 1000 | GAMES | 85002 |
| E | 2 | 0 | GAMES | 85000 |
| F | 3 | 0 | GAMES | 85004 |
| G | 2 | 0 | EDUCATIONAL | 85001 |
| H | 4 | 0 | EDUCATIONAL | 85001 |
| I | 5 | 0 | EDUCATIONAL | 85002 |
| J | 20 | 50000 | ENTERTAINMENT | 85001 |
| K | 22 | 50000 | ENTERTAINMENT | 85000 |
| L | 21 | 50000 | ENTERTAINMENT | 85003 |
| M | 30 | 100000 | FOOD | 84999 |
| N | 32 | 100000 | FOOD | 85001 |
| O | 30 | 100000 | NEWS | 85002 |
| P | 31 | 100000 | NEWS | 85000 |

Figure 4

| Profile | Average Age | Income | Genre | % | ZIP |
|---|---|---|---|---|---|
| 1 | 11 | 6500 | FICTION | 75.00% | 85001 |
|  |  |  | GAMES | 25.00% |  |
| 2 | 3.2 | 0 | GAMES | 40.00% |  |
|  |  |  | EDUCATIONAL | 60.00% |  |
| 3 | 21 | 50000 | ENTERTAINMENT | 100.00% |  |
| 4 | 30.75 | 100000 | FOOD | 50.00% |  |
|  |  |  | NEWS | 50.00% |  |

Output Profile

FIGURE 6

METHOD OF DETERMINING PROFILES FOR WIDGET CHANNEL VIEWERS

FIELD

The present disclosure generally relates to the field of computing and digital content usage. More particularly, an embodiment of the invention generally relates to automatically determining viewer profiles for a digital content entertainment system based on system usage.

BACKGROUND

When providing digital content for interactive television (TV) systems, there is a need to identify and/or describe the viewer in order to target the available content to the viewer or to perform an action based on the viewer's attributes. One problem is that there is often a lack of participation on the part of the viewer in providing his or her interests or specifically entering a viewer profile. Therefore, there is a need to identify the demographics and interests of the viewer without requiring an "opt-in" system and without forcing explicit inputs of that information from the viewer.

BRIEF DESCRIPTION OF THE DRAWINGS

The detailed description is provided with reference to the accompanying figures. The use of the same reference numbers in different figures indicates similar or identical items.

FIG. 4 is an example of input data from widgets according to an embodiment of the present invention.

FIG. 6 is an example of viewer profiles determined according to an embodiment of the present invention.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software (including for example micro-code that controls the operations of a processor), or some combination thereof. Further, although steps of a process may be disclosed in a certain order, in various embodiments those steps may be rearranged or performed in parallel.

Figure 1:
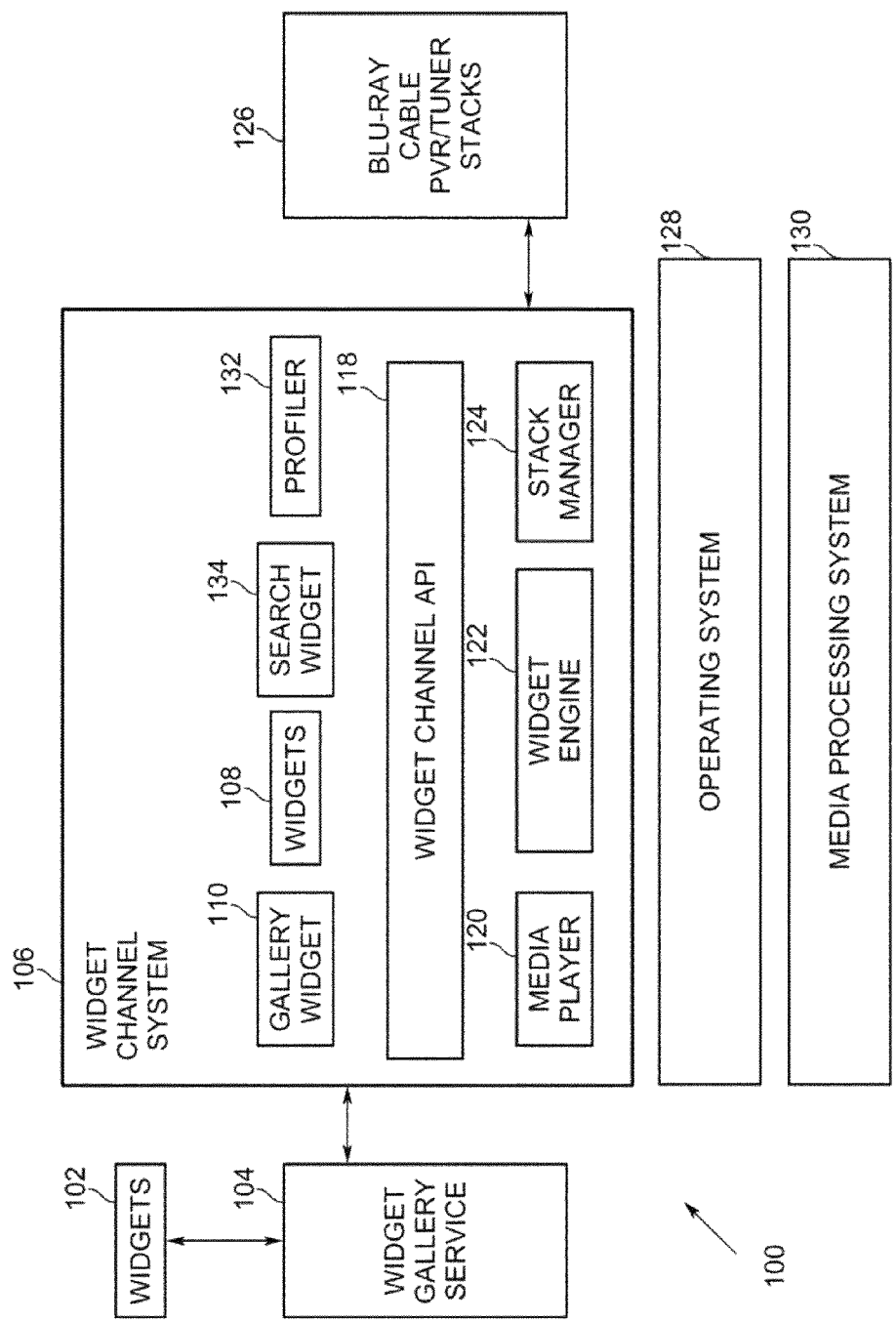
FIG. 1 is a block diagram illustrating an embodiment of a digital content entertainment system in accordance with some embodiments of the invention.

FIG. 1 is a block diagram illustrating an embodiment of a Digital Content Entertainment System 100 in accordance with some embodiments of the invention. Data processing for the Digital Content Entertainment System 100 may be provided by Media Processing System 130. Media Processing System 130 may include hardware, firmware, and software to enhance seamless delivery of audio and video data to a viewer from both the Internet and broadcast TV sources. Media Processing System 130 includes functional units for robust two dimensional (2D)/three dimensional (3D) graphics, flexible input/output (I/O), security and a unified high speed memory subsystem for optimal responsiveness within Internet applications. Operating System (OS) 128 may comprise software for controlling components of the Media Processing System, as well as device driver software for interfacing with various I/O devices. In an embodiment, the OS may be the LINUX operating system, but other operating systems may also be used. Digital content may be obtained for the Digital Content Entertainment System from various devices, represented here as Blu-Ray, cable and satellite TV, personal video recorder (PVR)/tuner stacks 126, in well known content formats. The SW Stacks refer to the application program interfaces (APIs) and libraries that support the required functionality, i.e., the Blu-Ray SW stack. In an embodiment, the Digital Content Entertainment System may include a Widget Channel System 106. The Widget Channel System 106 comprises a software framework that allows TV viewers to enjoy rich Internet applications called Widgets 108 while watching TV programs. The Widget Channel System takes advantage of the performance and media support of Media Processing System 130 and is powered by an applications platform called a Widget Engine 122. Widget Engine 122 controls the operation of Widgets 108. Widget Engine 122 may use Media Player component 120 to process audio and video data. The Widget Channel System allows developers to quickly and affordably develop and deploy widgets. The user interface is designed for TV-centric viewing and easy control and navigation using the TV's remote. In an embodiment, the Widget Channel System provides a set of capabilities. The first capability is the rapid development of widgets—small Internet application programs designed to complement and enhance the traditional TV watching experience and bring content, information and community features available on the Internet within easy reach of the remote control. The second capability is a TV-centric user interface that gives developers a consistent canvas for publication, with the flexibility needed for easy brand customization and differentiation. The third capability is cross-platform Widget Channel Application Programming Interface (API) 118 for widget development, based on industry standard technologies. The fourth capability is built-in support for security, privacy and parental controls. Designed to enable ease of development, components of Widget Channel System 106 include Widget Channel API 118, Widgets 108, Gallery Widget 110, Widget Gallery Service 104, Media Player 120, Widget Engine 122, and Stack Manager 124, as shown in FIG. 1. Stack Manager 124 manages the stacks that the Widget Channel interacts with; e.g., a Blu-Ray SW stack.

Widgets are small Internet applications designed to complement and enhance the traditional TV watching experience and bring content, information and community features available on the Internet within easy reach of the remote control. In an embodiment, each Widget comprises a self-contained Javascript and XML application that runs in a managed runtime environment (such as the Widget Engine in one embodiment), enabling predictable and reliable operation. Widgets use the Internet to connect to the same back-end Web services that support conventional browser-based applications. These Web services can deliver a rich array of content and services to the TV Widgets. The user interface provides a convenient way of accessing Web-based information and other services on TV while concurrently watching television or another video stream. To ensure a responsive user experience, Widgets can operate continuously in the background, checking for and downloading fresh information from the Internet, even when the widgets are not visible on the TV display. The computing performance and memory resources of the Digital Content Entertainment System determine how many TV Widgets can run concurrently and receive data in the background.

Widgets 102 may be created by an application developer. To be made available to a viewer, a widget may be obtained via Widget Gallery Service component 104. In one embodiment, the Widget Gallery Service comprises a web site that offers widgets for downloading to the Widget Channel System. The Widget Gallery Service 104 handles back-end services for reporting, storage, security and signature verification. It provides the source for differentiated services and may be updated. The Widget Gallery Service supplies a control point for the administration of business policies, as well as services from third-party developers. The Widget Gallery may include a diverse collection of widgets from developers, service providers and consumer electronics manufacturers, all of whom may use the Widget Channel API 118 to develop widgets. The Gallery Widget 110 comprises a component of the Widget Channel System that provides the capability for viewers to download new widgets to the Digital Content Entertainment System. It is a special purpose platform widget that connects to back-end Widget Gallery Service 104, and which manages widget downloads to the Digital Content Entertainment System. The Gallery Widget can be used to help ensure only trusted widgets are downloaded. It can also present viewers with a selection of widgets that are available to download and run on the Digital Content Entertainment System.

Once the Widget Gallery Service processes a new Widget 102, the widget may be stored as one of the Widgets 108 available for use by a viewer of the Digital Content Entertainment System 106. When a viewer is using the Digital Content Entertainment System, the viewer may select a Widget 108 to be run by Widget Engine 122 (a managed run-time environment).

Individual viewers can find and select the Widgets they prefer using Search Widget 134. For example, a sports aficionado can download a sports Widget to stay current on scores and other sports related news with the press of a button, while still viewing the current program on display monitor (such as a TV). Viewers can use Widgets to find more information about their favorite team, or choose to interact more deeply by having the Widget take over the full screen. Service providers may provide viewers with continuous updates and recommendations about content of special interest to them.

Once the viewer finds a desirable widget, the viewer may download and install the widget to the viewer's Widget Channel System. In an embodiment, the Search Widget may include a "search by categories" widget, where the categories represent attributes such as demographics, interests of viewers, genres of content, and the like. For example, one category may be age demographics, which may include values of children, ages 0-2, 2-4, 5-7, 8-10, 11-12, family, teen, young adult, adult, senior citizen, and so on. Another example category may be the gender of the viewer. Another example category may be location of the Digital Content Entertainment System, as represented by a zip code, a city, a state, or a country. Another example category relates to content genre, such as sports, drama, comedy, news, etc. Many categories of widgets may be available to search for using a Search Widget, and these examples are illustrative and not limiting. Each category may be represented by an associated attribute and attribute value for the widget. For example, for an entertainment widget geared to 5 to 7 year old boys in Los Angeles, Calif., the widget may have the attributes of age, gender, location, and the attribute values of 5-7, male, and 90210, respectively.

As viewers select, download, install, and run widgets over time, information may be collected regarding widget usage by one or more viewers. In an embodiment, this information may be used to automatically determine profiles of viewers of the Digital Content Entertainment System. In an embodiment, the determining of profiles may be performed by a Profiler 132 component of the Digital Content Entertainment System. Profiler component may be implemented in hardware, software, firmware, or a combination of these implementations.

Figure 2A:
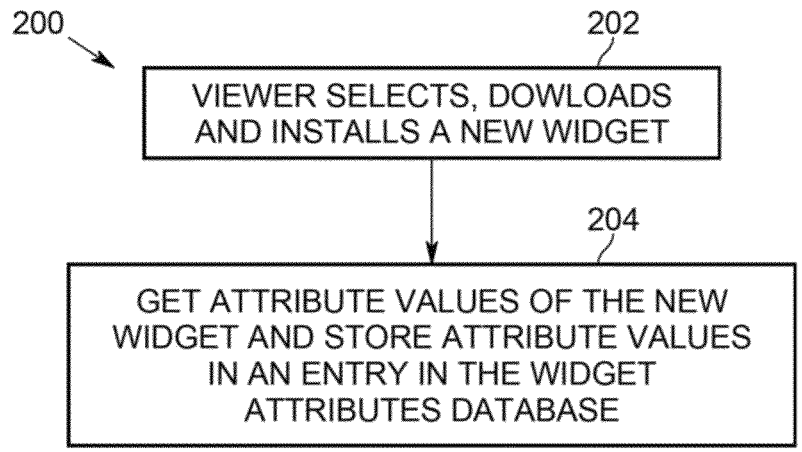
FIGS. 2A and 2B illustrate a widget attributes database and associated processing according to an embodiment of the present invention.
Figure 2B:
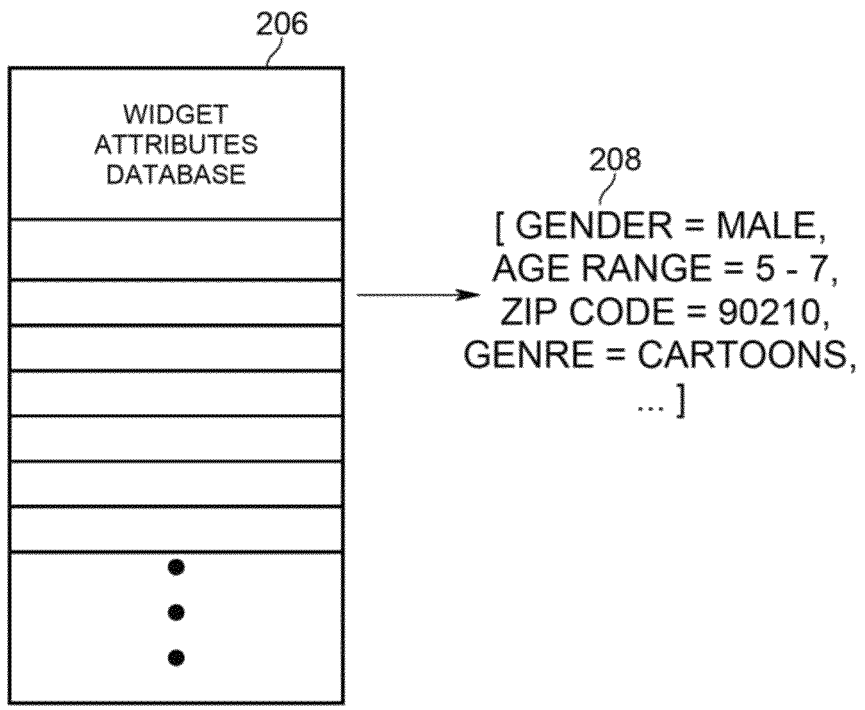

FIGS. 2A and 2B illustrate a Widget Attributes Database 206 and associated processing according to an embodiment of the present invention. At block 202 of process 200 in FIG. 2A, a viewer selects, downloads and installs a new widget into the Widget Channel System. In one embodiment, this occurs after the viewer searches for a widget using the Search Widget. Every widget has associated attributes and attribute values. At block 204, in an embodiment, Profiler component 132 gets the attributes and their values from the newly installed widget and loads this information into an entry in a Widget Attributes Database 206. In another embodiment, this functionality may be performed by the Search Widget. Thus, every time the Search Widget is used, more information may be collected in the Widget Attributes Database about the interests of the viewer. In an embodiment, widget attribute values may be stored in the Widget Attributes Database even for widgets that are searched for by the viewer but not actually downloaded and installed. FIG. 2B illustrates a simplified example of Widget Attributes Database 206. The Database includes a plurality of widget entries. Each widget entry includes a vector of attributes and attribute values for the widget as shown in the example vector 208. For example, one set of attributes and attribute values for a selected widget might be: gender=male, age=5-7, zip code=90210, and genre=cartoons. In an embodiment, when a viewer uninstalls a widget, the Widget Attributes Database may be updated to remove the entry for the uninstalled widget. In an embodiment, the Widget Attributes Database may be stored in a storage device within the Digital Content Entertainment System that is accessible by Profiler 132.

Profiler 132 may be activated to automatically determine profiles for the viewers of the Digital Content Entertainment System without explicitly polling the viewers for input data. That is, the Profiler determines profiles based on observed viewing and widget control behavior of the viewers. In one embodiment, the Profiler uses the widget attribute information stored in the Widget Attributes Database to determine the profiles. Operation of the Profiler to determine and/or update profiles for viewers may be performed at certain points in time, depending on the specific implementation of the Profiler. For example, in an embodiment, the Profiler may be executed once per week, once every two weeks, once per month, or another selected time frame. In another embodiment, the Profiler may be executed once for every specified number of new widgets installed (e.g., every 5, 10, 20, 50, 100, etc.). In an embodiment, the Profiler may be executed whenever a widget is uninstalled. In an embodiment, viewer profiles may be stored in a storage device within the Digital Content Entertainment System.

Figure 3:
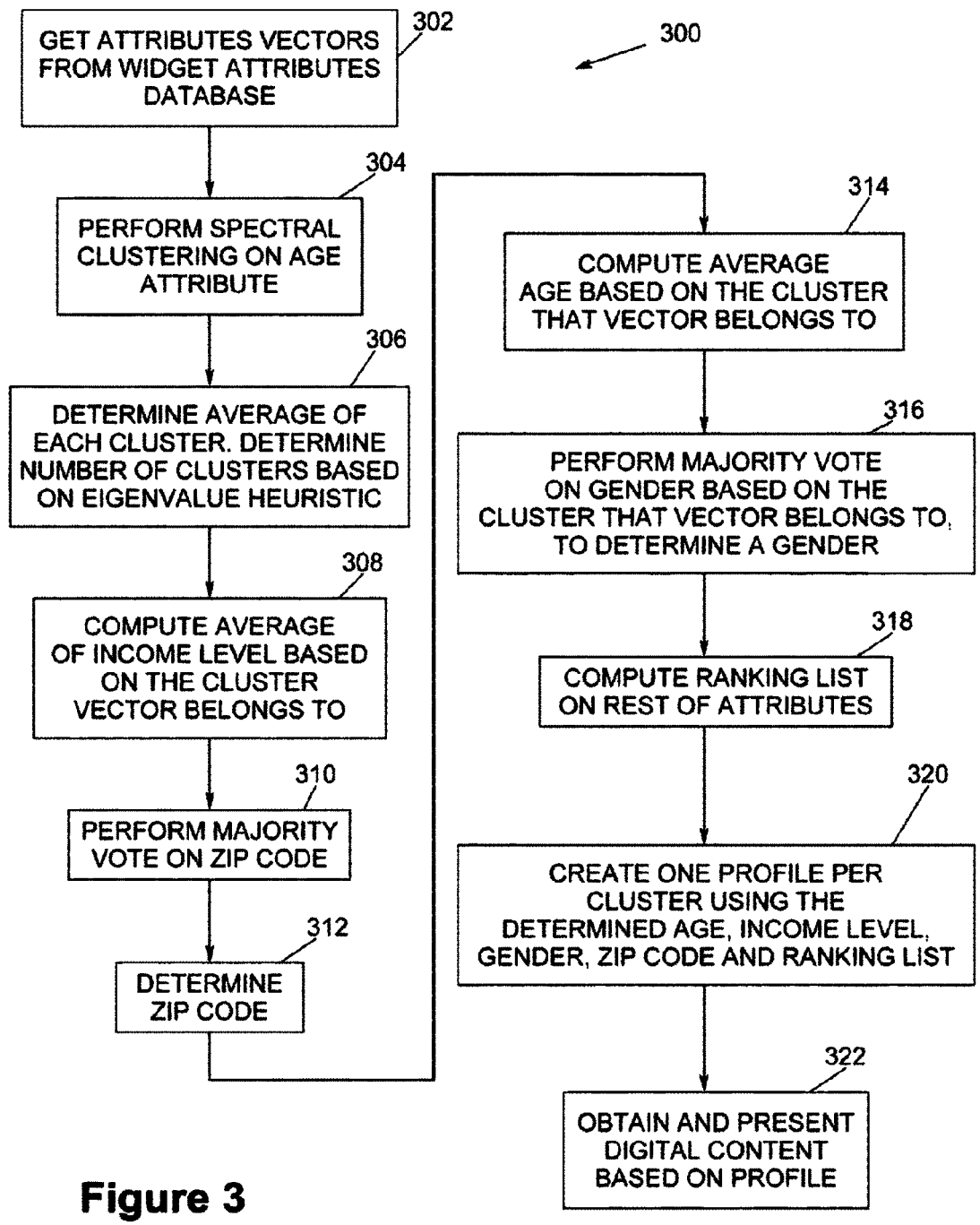
FIG. 3 is a flow diagram of a process for automatically determining viewer profiles according to an embodiment of the present invention.
Figure 5:
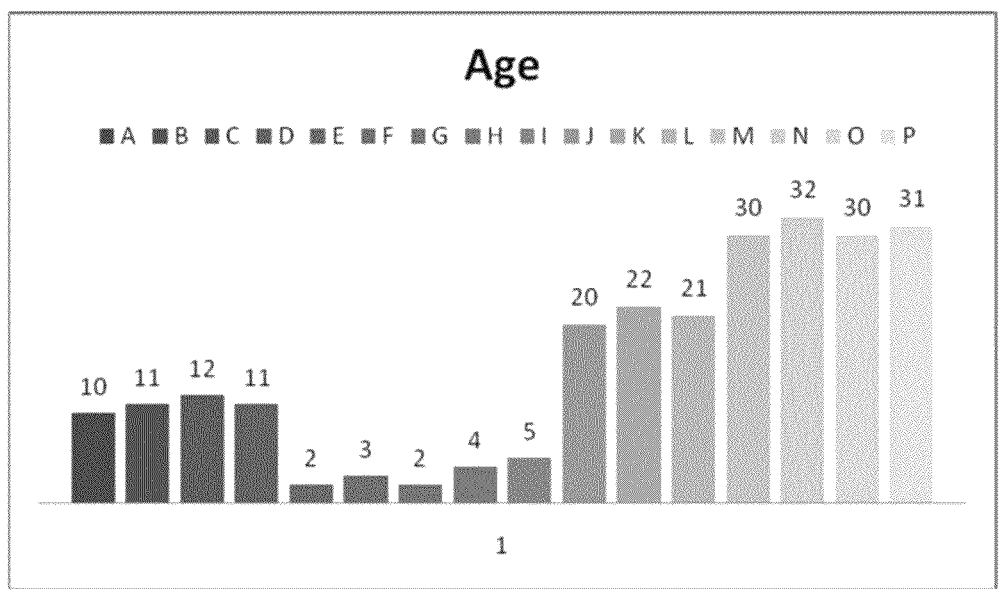
FIG. 5 is an example of an age chart determined according to an embodiment of the present invention.

FIG. 3 is a flow diagram of a process 300 for automatically determining viewer profiles according to an embodiment of the present invention. At block 302, Profiler component 132 gets all attribute vectors from the Widget Attributes Database. An example of attribute vectors that may be obtained from widgets is shown in FIG. 4. At block 304, Profiler performs a spectral clustering process using the values for the age attribute from all attribute vectors to determine one or more clusters. Spectral clustering processes which may be used are described in "A Tutorial on Spectral Clustering" by Ulrike von Luxeburg, Statistics and Computing, 17 (4), 2007. In an embodiment, the cluster determined by the spectral clustering process may be performed on the age attribute values of the attribute vectors and be based on the Eigenvalue heuristic with the e-neighborhood graph similarity metric. An advantage of using spectral clustering with the Eigenvalue heuristic is that the number of clusters is not assumed, in contrast to other clustering techniques where the number of clusters must be predetermined. FIG. 5 shows an example of a bar chart of age values after the spectral clustering process has been performed. Four clusters may be seen, at ages approximately 11, 2, 21, and 30 in this example. The output data of the spectral clustering process comprises one or more clusters for the entire set of attributes vectors. A cluster will be represented by an average value for the age attribute, and also given a sample; it can be determined which cluster the sample belongs to. At block 306, the Profiler determines the average of each cluster with respect to age. The Profiler then determines the number of clusters based on the Eigenvalue heuristic. At block 308, in one embodiment where income level data is available or may be inferred from the widget, the average of the income level attribute values for all attribute vectors may be computed based on the cluster that a selected vector (representing a widget) belongs to. After the clustering step based on the age attribute, each widget/vector will belong to a cluster. The selected vector may be the vector representing the widget that income level has been extracted that is the average per cluster. Next, at block 310, a majority vote may be performed on the zip code attribute values in order to determine a zip code for all of the viewers at block 312. Majority vote is an process that will pick the value that has more votes. i.e., 3 widgets have zip code #1 and 1 widget has zip code #2, then zip code #1 is the chosen one.

At block 314, the average of the age attribute values may be computed based on the cluster that a selected attribute vector (representing the widget being analyzed) belongs to, in order to determine the age for the at least one viewer profile. At block 316, a majority vote may be performed on the gender attribute values based on the cluster that a selected attribute vector belongs to, in order to determine the gender for the at least one viewer profile. At block 318, the Profile may compute a ranking list of the rest of the attributes (other than age, gender, zip code, and income level), based on the number of the attribute values that are present. In various embodiments, any number of additional attributes may be used. In an embodiment, another attribute may be genre. For example if for a genre attribute there are 15 'Fiction' widgets and 10 'Nature' widgets, then the ranking list will have 'Fiction' first and 'Nature' second with a weight for each entry. In an embodiment, the weight may be computed as a normalization, i.e., 'Fiction=15+10/25'. At block 320, the Profiler may create one profile per cluster by using the determined age, gender, zip code, income level, and ranking list. In an embodiment, the Profiler may combine multiple attribute vectors to represent a single viewer and the viewer's profile. The result of the profiling process may be a set of one or more viewer profiles corresponding to each of one or more viewers. FIG. 6 is an example of a set of profiles which may be determined by the automatic profile determining process.

Once a viewer profile has been determined, the viewer profile may be referenced by the Widget Channel System in order to proactively obtain and present digital content and/or widgets that may be likely to be of interest to the viewer at block 322. The selected digital content and/or widgets may be shown on a display coupled to the Digital Content Entertainment System.

The process for automatically determining viewer profiles as described herein does not use an "opt-in" strategy, does not require viewer registration, respects the privacy of the viewer (due to no querying for name, address, or other private information), and does not require a viewer login or explicit profile enrollment. Furthermore, embodiments of the present invention do not assume a certain number of household members (viewers) or groups in the home.

Figure 7:
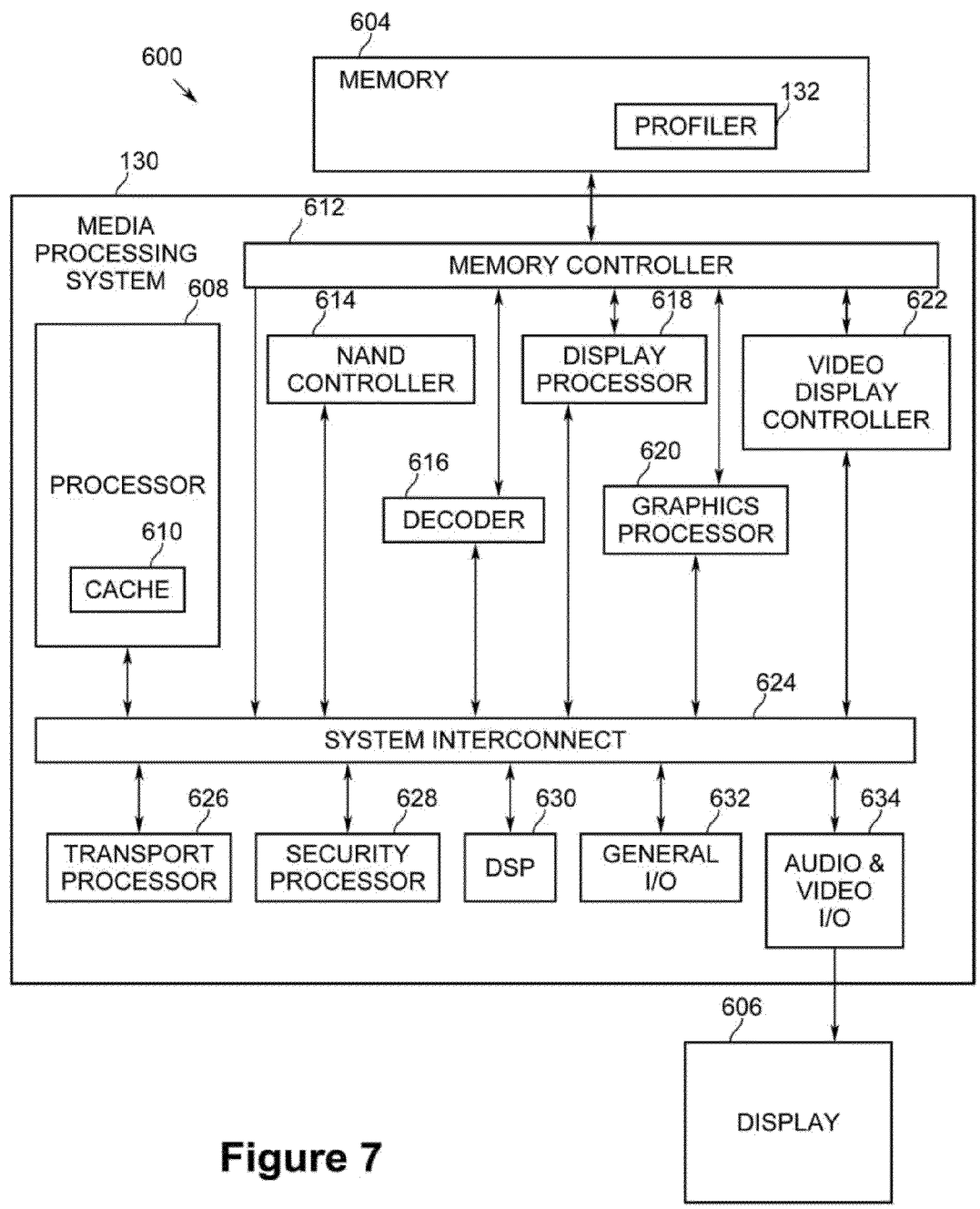
FIG. 7 is a diagram of a media processing system for performing the process of FIGS. 2 and 3 according to an embodiment of the present invention.

FIG. 7 illustrates a block diagram of an embodiment of a Digital Content Entertainment System 600. In various embodiments, one or more of the components of the system 600 may be provided in various electronic devices capable of performing one or more of the operations discussed herein with reference to some embodiments of the invention. For example, one or more of the components of the system 600 may be used to perform the operations discussed with reference to FIGS. 1-6 and the Widget Channel System, including the Profiler, e.g., by processing instructions, executing subroutines, etc. in accordance with the operations discussed herein. Also, various storage devices discussed herein (e.g., with reference to FIG. 7) may be used to store data, operation results, etc. In one embodiment, data may be stored in caches 610 present in processor 608 of Media Processing System 130 or in memory 604. The processor 608 may then apply the operations discussed herein to automatically determine viewer profiles in accordance with various embodiments of the invention. In an embodiment, Media Processing System may be implemented as "system on a chip" (SOC) and comprise a single integrated circuit die. In an embodiment, Media Processing system 130 may be designed to meet design requirements of Internet Protocol (IP) television and/or hybrid set-top boxes, and connect audio/video products.

Various operations discussed herein may be performed by processor 608 in some embodiments. Processor 608 may include a general purpose processor, or other types of a processor (including a reduced instruction set computer (RISC) processor or a complex instruction set computer (CISC)). Processor 608 may have a single or multiple core design. Processors 608 with a multiple core design may integrate different types of processor cores on the same integrated circuit (IC) die. Also, the processors 608 with a multiple core design may be implemented as symmetrical or asymmetrical multiprocessors. Moreover, some of the operations discussed with reference to FIGS. 1-6 may be performed by one or more components of the Media Processing System 130.

Memory 604 may store data, including sequences of instructions that are executed by the processor 608, or by any other device included in the media processing system 130. Furthermore, memory 604 may store one or more of the programs or algorithms discussed herein such Profiler 132 to perform automatic determination of viewer profiles, instructions corresponding to executables, mappings, etc. The same or at least a portion of this data (including instructions) may be stored in a hard disk drive (not shown in FIG. 7) and/or one or more caches within processors 608. In one embodiment of the invention, the memory 604 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk.

In an embodiment, Media Processing System 130 may include a memory controller 612 to interface with memory 604 and other components internal to the media processing system. System interconnect 624 comprises a bus for interconnecting components within the media processing system. NAND flash controller 614 may be coupled to a NAND storage device (not shown) for purposes of secure booting and code/data storage and to system interconnect 624. A multi-format hardware decoder 616 may be included to decode single stream and multi-stream video data in various well known formats. In an embodiment, decoder performs multi-stream decode and display of up to 1920×1080p at 60 frames per second and single stream decode and display at approximately twice that rate. Display processor 618 may provide scaling, noise reduction, and motion adaptive de-interlacing operations on video data. Graphics processor 620 may provide a three dimensional (3D) shader architecture. Video display controller 622 may provide universal planes supporting both video and graphics pixels, blending operations supporting sideband, global, and per-pixel alpha blending per plane, and scaling operations. Transport processor 626 may provide programmable transport demux and two serial transport stream interfaces. Security processor 628 may provide two smart card interfaces, high definition content protection (HDCP) for high definition media interface (HDMI) data transfers, and hardware acceleration of security processing. Digital signal processor (DSP) 630 may support audio decoding operations. General input/output (I/O) 632 may support connections over well known interfaces such as universal serial bus (USB), serial advanced technology attachment (SATA), and Ethernet, and may connect to computer networks such as the Internet. Audio and Video I/O 634 may provide an interface to display 406 for output of video data as well as an interface to speakers (not shown) for audio output.

In an embodiment of the invention, display 606 may be a flat panel display that communicates with audio and video I/O 634 through, for example, a signal converter that translates a digital representation of an image stored in a storage device such as video memory or system memory into display signals that are interpreted and displayed by the display 606. The display signals produced by the audio and video I/O 634 may pass through various control devices (not shown for simplicity) before being interpreted by and subsequently displayed on the display 406.

Digital Content Entertainment System 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, or other types of nonvolatile machine-readable media that are capable of storing electronic data (e.g., including instructions).

In various embodiments of the invention, the operations discussed herein, e.g., with reference to FIGS. 1-6, may be implemented as hardware (e.g., logic circuitry), software (including, for example, micro-code that controls the operations of a processor such as the processors discussed with reference to FIG. 7), firmware, or combinations thereof, which may be provided as a computer program product, e.g., including a tangible machine-readable or computer-readable medium having stored thereon instructions (or software procedures) used to program a computer (e.g., a processor or other logic of a computing device) to perform an operation discussed herein. The machine-readable medium may include a storage device such as those discussed herein.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Additionally, such computer-readable media may be downloaded as a computer program product, wherein the program may be transferred from a remote computer (e.g., a server) to a requesting computer (e.g., a client) by way of data signals, via a communication link (e.g., a bus, a modem, or a network connection).

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. In a digital content entertainment system, a method comprising:
 obtaining attributes vectors storing values for attributes of each of a plurality of widgets installed in the digital content entertainment system;
 automatically creating at least one profile of a viewer of the digital content entertainment system at least in part by performing a spectral clustering process on the attributes vectors using values for age attributes from all attribute vectors to determine one or more clusters based on an Eigenvalue heuristic with an e-neighborhood graph similarity metric; and
 proactively obtaining and presenting digital content of interest to the viewer on a display of the digital content entertainment system based at least in part on the automatically generated at least one viewer profile.

2. The method of claim 1, further comprising computing an average income level for viewers based on a cluster that a selected attributes vector belongs to.

3. The method of claim 2, further comprising performing a majority vote on zip code attribute values to determine a zip code for all viewers of the digital content entertainment system.

4. The method of claim 3, further comprising computing an average age on age attribute values based at least in part on the cluster that a selected attributes vector belongs to, to determine an age for the at least one viewer profile.

5. The method of claim 4, further comprising performing a majority vote on gender attribute values based at least in part on the cluster that the selected attributes vector belongs to, to determine a gender for the at least one viewer profile.

6. The method of claim 5, further comprising computing a ranking list of remaining attributes.

7. The method of claim 6, further comprising creating one viewer profile per cluster using the determined age, determined gender, determined zip code, income level, and the ranking list.

8. The method of claim 1, further comprising storing an attributes vector for each widget downloaded and installed in the digital content entertainment system.

9. The method of claim 1, wherein the digital content of interest obtained and presented to the viewer comprises additional widgets.

10. A non-transitory computer-readable medium comprising one or more instructions that when executed on a processor configure the processor to perform one or more operations to:

obtain attributes vectors storing values for attributes of each of a plurality of widgets installed in the digital content entertainment system;

automatically create at least one profile of a viewer of the digital content entertainment system at least in part by performing a spectral clustering process on the attributes vectors using values for age attributes from all attribute vectors to determine one or more clusters based on an Eigenvalue heuristic with an e-neighborhood graph similarity metric; and proactively obtain and present digital content of interest to the viewer on a display of the digital content entertainment system based at least in part on the automatically generated at least one viewer profile.

11. The non-transitory computer-readable medium of claim 10, further comprising instructions to compute an average income level for viewers based on a cluster that a selected attributes vector belongs to.

12. The non-transitory computer-readable medium of claim 11, further comprising instructions to perform a majority vote on zip code attribute values to determine a zip code for all of the viewers of the digital content entertainment system.

13. The non-transitory computer-readable medium of claim 12, further comprising instructions to compute an average age on age attribute values based at least in part on the cluster that a selected attributes vector belongs to, to determine an age for the at least one viewer profile.

14. The non-transitory computer-readable medium of claim 13, further comprising instructions to perform a majority vote on gender attribute values based at least in part on the cluster that the selected attributes vector belongs to, to determine a gender for the at least one viewer profile.

15. The non-transitory computer-readable medium of claim 14, further comprising instructions to compute a ranking list of remaining attributes.

16. The non-transitory computer-readable medium of claim 15, further comprising instructions to create one viewer profile per cluster using the determined age, determined gender, determined zip code, income level, and the ranking list.

17. A digital content entertainment system comprising:
a display;
a memory to store one or more instructions corresponding to a widget channel system; and
a processor to execute the one or more instructions of the widget channel system to obtain attributes vectors storing values for attributes of each of a plurality of widgets installed in the digital content entertainment system; to automatically create at least one profile of a viewer of the digital content entertainment system at least in part by performing a spectral clustering process on the attributes vectors using values for age attributes from all attribute vectors to determine one or more clusters based on an Eigenvalue heuristic with an e-neighborhood graph similarity metric; and to proactively obtain and present digital content of interest to the viewer on the display based at least in part on the automatically generated at least one viewer profile.

18. The digital content entertainment system of claim 1, further comprising instructions to compute an average income level for viewers based on a cluster that a selected attributes vector belongs to.

19. The digital content entertainment system of claim 18, further comprising instructions to perform a majority vote on zip code attribute values to determine a zip code for all of the viewers of the digital content entertainment system.

20. The digital content entertainment system of claim 19, further comprising instructions to computer an average age on age attribute values based at least in part on the cluster that a selected attributes vector belongs to, to determine an age for the at least one viewer profile.

21. The digital content entertainment system of claim 20, further comprising instructions to perform a majority vote on gender attribute values based at least in part on the cluster that the selected attributes vector belongs to, to determine a gender for the at least one viewer profile.

22. The digital content entertainment system of claim 21, further comprising instructions to compute a ranking list of remaining attributes.

23. The digital content entertainment system of claim 22, further comprising instructions to create one viewer profile per cluster using the determined age, determined gender, determined zip code, income level, and the ranking list.

* * * * *